(12) United States Patent
Antonucci Salazar

(10) Patent No.: US 12,098,443 B2
(45) Date of Patent: Sep. 24, 2024

(54) SYSTEM AND METHOD FOR SOLUBILISING IN AN AQUEOUS MEDIUM ELEMENTS CONTAINED IN A SULFIDE ORE CONCENTRATE

(71) Applicant: PLATINUM GROUP CHILE SPA, Viña del Mar (CL)

(72) Inventor: Victor Antonucci Salazar, Viña del Mar (CL)

(73) Assignee: PLATINUM GROUP CHILE SPA, Vina del Mar (CL)

(*) Notice: Subject to any disclaimer, the term of this patent is extended or adjusted under 35 U.S.C. 154(b) by 720 days.

(21) Appl. No.: 17/271,730

(22) PCT Filed: Aug. 27, 2019

(86) PCT No.: PCT/CL2019/050077
§ 371 (c)(1),
(2) Date: Feb. 26, 2021

(87) PCT Pub. No.: WO2020/041914
PCT Pub. Date: Mar. 5, 2020

(65) Prior Publication Data
US 2021/0317546 A1 Oct. 14, 2021

(30) Foreign Application Priority Data
Aug. 28, 2018 (CL) .................. 2460-2018

(51) Int. Cl.
C22B 3/08 (2006.01)
C22B 1/16 (2006.01)
(Continued)

(52) U.S. Cl.
CPC .................. *C22B 3/08* (2013.01); *C22B 1/16* (2013.01); *C22B 4/04* (2013.01); *C22B 4/08* (2013.01)

(58) Field of Classification Search
CPC .... C22B 1/16; C22B 3/08; C22B 4/04; C22B 4/08; C22B 15/00; C22B 23/00; C22B 1/06; C22B 3/02
(Continued)

(56) References Cited

U.S. PATENT DOCUMENTS

2005/0103157 A1 5/2005 Kruesi et al.
2015/0211092 A1 7/2015 Chaiko
(Continued)

FOREIGN PATENT DOCUMENTS

CL 199801650 12/1999
CN 101323909 A 12/2008
(Continued)

OTHER PUBLICATIONS

PCT International Search Report for International Application No. PCT/CL2019/050077, dated Dec. 27, 2019, 11 pages.
(Continued)

*Primary Examiner* — Jessee R Roe
*Assistant Examiner* — Michael Aboagye
(74) *Attorney, Agent, or Firm* — Hoffman Warnick LLC

(57) ABSTRACT

A system for using aqueous means for solubilizing chemical components contained in Sulphur type ore concentrate which may contain iron, cobalt, nickel, copper, platinum group metals and other metals considered valuable and of commercial interest, and a method of using the aqueous means for solubilizing such components is described.

12 Claims, 1 Drawing Sheet

(51) Int. Cl.
*C22B 4/04* (2006.01)
*C22B 4/08* (2006.01)

(58) Field of Classification Search
USPC ......... 75/743, 744, 739, 738, 711, 726, 740, 75/741; 266/101, 144
See application file for complete search history.

(56) References Cited

U.S. PATENT DOCUMENTS

2016/0045841 A1  2/2016  Kaplan et al.
2021/0317546 A1* 10/2021  Antonucci Salazar ... C22B 3/02

FOREIGN PATENT DOCUMENTS

| CN | 103451438 A | | 12/2013 | |
|---|---|---|---|---|
| CN | 109234544 A | * | 1/2019 | ............... B09B 3/00 |
| WO | 03102250 A1 | | 12/2003 | |
| WO | 2013067577 A1 | | 5/2013 | |
| WO | 2015081372 A2 | | 6/2015 | |

OTHER PUBLICATIONS

Chao-Yin Kuo et al., "Removal of copper from industrial sludge by traditional and microwave acid extraction," Elsevier, Journal of Hazardous Material, B120, 2005, pp. 249-256.
J. B. Yianatos et al., "Molybdenite concentrate cleaning by copper sulfation activated by microwave," ScienceDirect, Minerals Engineering, vol. 14, Issue 11, Nov. 2001, pp. 1411-1419.
M. Al-Harahsheh et al., "Microwave-assisted leaching—a review," Elsevier, ScienceDirect, Hydrometallurgy 73, 2004 pp. 189-203.
M. Al-Harahsheh et al., "The influence of microwaves on the leaching kinetics of chalcopyrite," Elsevier, ScienceDirect, Minerals Engineering 18, 2005, pp. 1259-1268.
Arriagada, S. "Estado Del Arte Acerca Del Uso De Microondas En Lixiviacion De Minerales Sulfurados De Cobre Con Especial Enfasis En Minerales Calcopiriticos," Informe de Memoria de Titulo, Para optar al titulo de Ingeniero Civil Metalurgico. Universidad De Concepcion, Facultad de Ingenieria, Departamento de Ingenieria Metalurgica, Julio 2017.

* cited by examiner

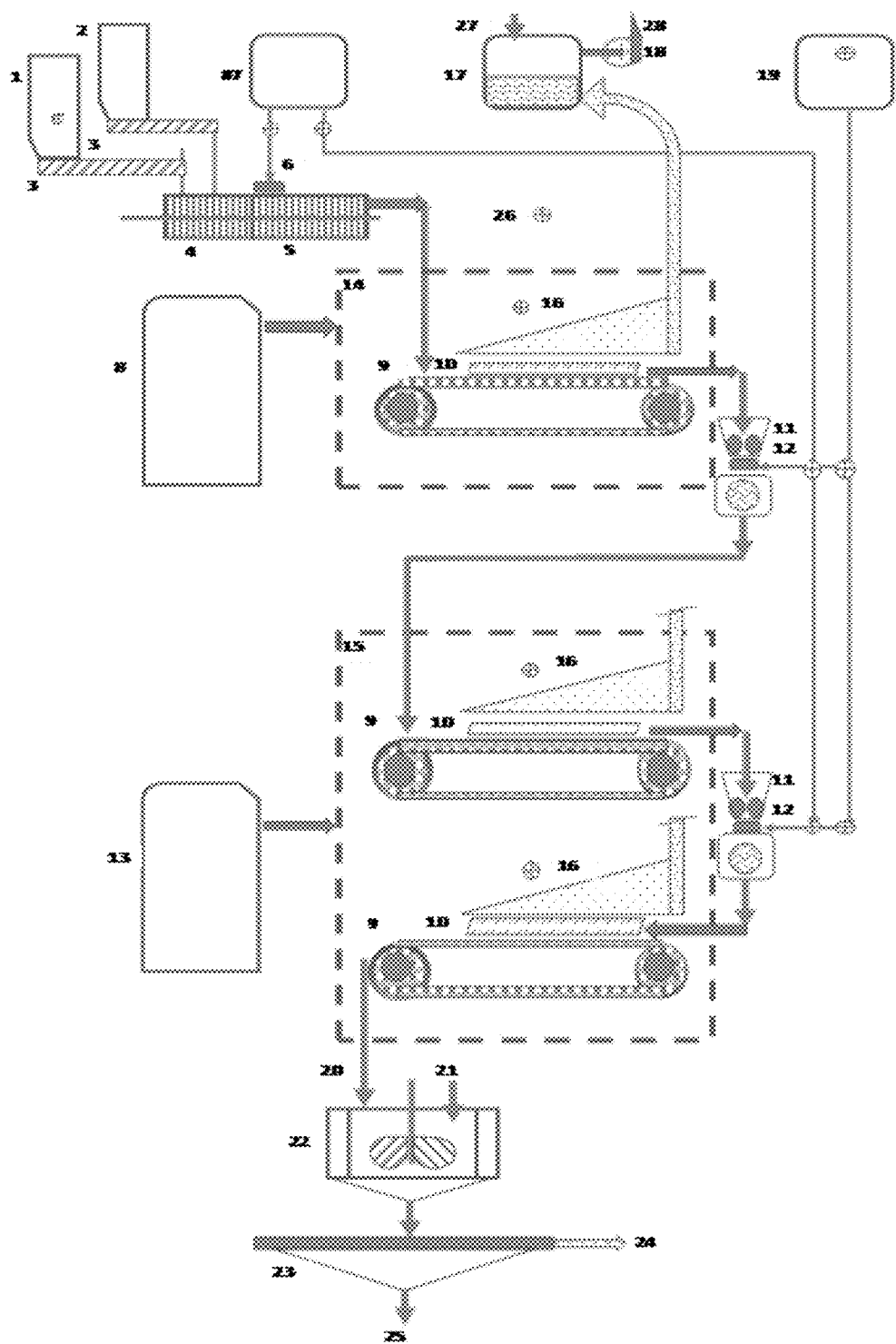

SYSTEM AND METHOD FOR SOLUBILISING IN AN AQUEOUS MEDIUM ELEMENTS CONTAINED IN A SULFIDE ORE CONCENTRATE

SCOPE OF THE INVENTION

In general terms, this invention deals with a system/method for using an aqueous means for solubilizing components contained in sulphur type ore concentrate containing metals such as iron, cobalt, niquel, copper, all of them belonging to the platinum group and other precious metals of commercial interest, associated to their relevant groups and periods described in the Periodic Table of Chemical Components, as a matter of public record.

BACKGROUND OF THE INVENTION

It is well known that other techniques used for extracting precious metals from ore concentrate use energy oxidant materials, highly pressurized oxygen and high temperature at the expense of applying traditional energy sources. In order to achieve such goal, it is necessary to build batch operation complex reactors, specially armored for its operational safety and to avoid hazards when using high pressure and chemical corrosives.

Additionally, other processes, such as "bioleaching", allow to solubilize iron sulphide contained in ore concentrate, by using specific bacteria to oxidize metal sulphides into their relevant soluble sulphates in an aqueous means. However, in order to protect and keep an active/stable bacterial concentration, it is necessary to implement suitable operational conditions for the industrial field wherein it will be applied. In this case, industrial water quality and its nutrients, are quite relevant factors.

During the last few years, research has also been done about using microwaves in metallurgy linked chemical reactions. In this context, the Patent EP0041841, describes the results of laboratory experiments aimed to study the effect of microwaves on chemical reactions, testing samples whose weights range from 25 to 120 grams. Such patent does not describe any novelty about how to apply highly efficient sulphuric acid and microwave energy aimed to be industrially used in a competitive manner. Another patent, the U.S. Pat. No. 5,091,160 describes the use of microwaves radiation for eliminating foams in ore leaching, but this has nothing to do with this application.

In a similar concept, the patent U.S. Pat. No. 5,154,899, describes a method for recovering plutonium from a matrix to which porosity is induced by means of incineration, being further leached with tetrahydrofluoric acid and nitric acid, and using microwaves in a sealed reactor, operating with a pressure of 690 [kPa] and at 200° C., in small amounts. Such patent is not related with this application.

On the other hand, the Patent WO 89/04379 describes the use of particulate coal and tin ore concentrate, chromium, iron and ilmenite, duly dried and arranged inside a vertical column subject to a domestic microwaves field (electromagnetic frequency at 2,450 megahertz), till obtaining metal drops to be further collected. In all these previous cases, the information published about these lab research is academic and is oriented to a potential industrial application.

Finally, among the patents related with this application, Patent CL1650-98 named as "Method for accelerating copper sulphation contained in ore concentrate". Such publication makes reference to a method using concentrate of chalcopyrite copper, concentrate industrial sulphuric acid and industrial microwaves energy. Additionally, such method does not use oxygen, and operates with a tilted reaction platform. It uses a mass of material whose particles must be small spheres supplied by a pelletizing equipment and it has no complementary stages for online reducing the size of the particles.

This invention consists of a system/method for quickly getting chemical solubility—in an aqueous means- to the components contained in sulphur type ore concentrate containing iron, cobalt, niquel, copper, platinum group metals and other metal components of commercial interest.

GENERAL DESCRIPTION OF THE INVENTION

This invention consists of a system/method applying industrial microwave energy with a frequency at 915 MHz, as a catalyzer for chemical reactions and sulphuric acid concentrate mixed with pressurized oxygen, which enhance the power of sulphuric acid oxidation as chemical oxidant, and facilitates the solubilization—in an aqueous means- to components contained in sulphur type ore concentrate, containing the aforementioned metals, which are deemed as raw material.

Depending on where the mining company is located, preferably copper mining, such raw material may contain generic mineralogy in metals such as iron, cobalt, niquel, copper, platinum group metals and other metal components of commercial interest, identified in their relevant groups described in the Periodic Table of Chemical Components, a matter of public record.

The system using aqueous means for solubilizing the components contained in sulphur type ore concentrate containing iron, cobalt, niquel, copper, platinum group metals and other precious components is made up of:
a) A blending device made up of:
   a first chute containing ore concentrate (1),
   a second chute containing coal (2),
   wherein each chute has a "worm gear" to be unloaded (3),
   a first blending deposit for blending solids (4),
   a second agitating deposit for adding sulphuric acid (5),
   one reservoir containing sulphuric acid concentrate, at a minimum of 96%. (7), and,
   an injector for spraying sulphuric acid onto the solid blend (6);
b) a device for chemical reactions made up of:
   a first microwaves power generator (8),
   containing flow, pressure & temperature sensors (26)
   a second microwaves power generator (13),
   a first multi mode chamber (14), and
   a second multi mode chamber (15),
   wherein each multi mode chamber has one or more conveyor belts (9), each multi mode chamber also has one or more devices used to change solid particles (10) positioning;
c) external disaggregators (11) for reducing the size of solid sulphated particles;
d) A suitable blender mixing a blend made up of sulphuric acid concentrate, with minimum purity of 96%, and gaseous oxygen applied at stoichiometric pressure, provided with devices aimed to control internal behavior, such as pressure and temperature sensors, designed with opening attachments aimed to introduce components facilitating contact between acid and oxygen, and other components facilitating materials coming in/out associated to the preparation of this blend to be sprayed onto the material unloaded by the external disaggregators (12);

and) a sulphurous gases collecting device made up of a hood for extracting sulphurous gases (16), and water trap for sulphurous gases (17), containing industrial water (27);

f) a device for capturing elemental sulphur (18);

g) agitation tank (22); and h) clarifying tank (23).

Additionally, a method—using aqueous means—for solubilizing is described for components contained in sulphur type ore concentrate, containing metals such as iron, cobalt, niquel, copper, platinum group metals and other precious metals of commercial interest, identified in their relevant groups and periods, described in the Periodic System of Chemical Components, which is a matter of public record. This comprises various activities arranged in a sequence for continuous operation, and are as follows:

a) Feed in dry ore concentrate (with humidity not higher than 0.5%) in the first chute and feed in vegetable charcoal in the second chute;

b) Blend the products till obtaining a homogeneous mass, which is to happen within a residence period to be determined;

c) the resulting blend will be sprayed with a dose of sulphuric acid aimed to produce a mass of sufficiently agglomerated/irregular particles, whose size is between 5 to 8 mm;

d) deposit the mass of agglomerated particles onto the conveying device for circulating such product inside the multimodal chambers;

e) In the first multi mode chamber generating group, apply industrial microwaves energy (a frequency of 915 MHz) continuously in order to raise the temperature from its initial value to a range within 180 to 200° C.;

f) the second multi mode chamber generating group will apply discontinuous industrial microwaves energy, according to a thermal profile set for keeping the reaction temperature in a range between 180 to 200° C.;

g) Disaggregate the outcoming material from the reactions of the previous steps, for reducing the size of the grains;

h) once again agglomerate the disaggregated product by finely spraying sulphuric acid concentrate, 96% pure as a minimum, mixed with pressurized oxygen, whose amount is based on the chemical estechyometry of the process.

i) Modify the path and position of the grains of the reactant mass;

j) Exhaust the sulphurous gases resulting from the chemical reactions of the process, k) Carry sulphurous gases to a water sprayed column whose flow is contrary to the flow of the gases;

l) Mix the sulphated material—coming out from the reaction stage—with industrial water inside the agitation tank equipped inside with blades and vertical plates;

m) obtain an electrolyte with the dissolved metals of commercial interest; and n) to clarify the electrolyte containing the dissolved metals of commercial interest

DESCRIPTION OF THE FIGURES

FIG. 1 displays the drawing of the method used for solubilizing—in an aqueous means—the metals contained in iron sulphur type ore concentrate. Next the system components are described:

1: chute storing ore concentrate
2: chute storing material containing coal.
3: worm gear feeder
4: blender at the Homogenization Area
5: blender at the Agglomeration Area
6: injector for spraying sulphuric acid concentrate
7: reservoir for sulphuric acid concentrate
8: microwaves power Generator #1
9: segmented/continuous conveyor belt
10: particles path modifying device
11: external disaggregating/re-agglomerating device
12: injector for spraying a mix of sulphuric acid concentrate, at 96% as a minimum, plus pressurized gaseous oxygen
13: microwaves power Generator #2
14: multi Mode Chamber #1:
15: multi Mode Chamber #2
16: hood for exhausting sulphurous gases
17: water trap for sulphurous gases
18: Air extractor for circulation of sulphurous gases
19: Reservoir for pressurized gaseous oxygen
20: sulphated solid product resulting from the LOXS/MW/MOXS process
21: industrial water recycled for aqueous leaching
22: mechanical agitation tank
23: clarifying/disaggregating tank for liquids and solids
24: electrolyte clarified with dissolved commercial products
25: stockpile of remaining solids
26: flow/pressure/temperature sensors for the process
27: industrial water for washing sulphurous gases
28: particulate-matter-free air

COMPREHENSIVE DESCRIPTION OF THE INVENTION

This invention consists of a system/method applying industrial microwave energy. The applied microwaves power is absorbed by the mass particles—mainly those having dielectric properties—which is dissipated inside, thus increasing its temperature. The preparation of the mass of particles—as previously described which consists of generating a bigger specific surface for the mass of particles—facilitates absorption of microwaves power, eventually acting as a catalyzing agent. Apart from the irregular shape of the particles to be treated, the dielectric properties of the mineralogy making up the ore concentrate also participate in such absorption.

The sulphate crystals—formed during the reaction—grow in size, thus dragging the non reacting material and must be reduced in size in order to keep a proper specific surface of reaction ($cm^2$/grams of particulate matter under reaction) to be in contact with sprayed sulphuric acid blended with pressurized oxygen.

The final product of the reaction is a solid/dry particulate matter mass which is mixed with water in order to make an aqueous pulp to be sent to a clarifying device from which—by using physical screening—an electrolyte with dissolved metals of commercial interest is obtained, and a stockpile to be discarded through the discharge pipe of such clarifier. The method and process for screening the various dissolved metals is not part of this invention.

Regarding the catalyzing agent used in this invention, it is important to highlight that the electromagnetic energy used in a frequency ranging 915 MHz is known as industrial microwaves. The transformation of electric power into this type of power is made with a conversion efficiency ranging 85% (Thermex Thermatron INC., U.S.TO.[1]). Microwaves power is transferred from its generating source to the multi mode chamber containing the reaction device, by using a rectangular metal conductor, named as "waves guide".

The structural/operational design of the device generating the microwaves power as a catalyzing agent is certified by OSHA (Occupational Safety and Health Administration) and guarantees operational feasibility of:
a) incoming/outcoming materials to and from the reaction device,
b) the operation of instruments used to measure inner temperature, and
c) inner lighting and watching devices inside the reaction chamber.

This is how chemical reactions of the process are carried out inserted in the microwaves field, but properly confined, in a stable manner and with no risks for people and surrounding facilities. This technology is a matter of public record and is not included in the Claims of this application.

Microwaves power is expressed in kilowatts and the value applied is function of the properties and amount of material to be treated—in this case, the irregular shaped agglomerated particles mass—with which the concept of specific power is stated to be expressed in kilowatts of microwaves power per kilogram of ore concentrate to be treated.

The main sulphation reactions of the main metals contained in the ore concentrate featuring national mining, apart from the use of sulphuric acid concentrate, gaseous oxygen and $SO_2$ reactivity when mixed with coal, activated by microwaves power application, are as follows:

in case of copper (example: Mineralogy based on Chalcopyrite) as a summary:

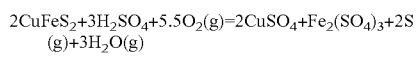
$$2CuFeS_2+3H_2SO_4+5.5O_2(g)=2CuSO_4+Fe_2(SO_4)_3+2S(g)+3H_2O(g)$$

in case of iron (example: Mineralogy based on Pyrite)

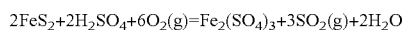
$$2FeS_2+2H_2SO_4+6O_2(g)=Fe_2(SO_4)_3+3SO_2(g)+2H_2O$$

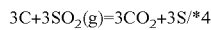
$$3C+3SO_2(g)=3CO_2+3S/*4$$

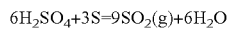
$$6H_2SO_4+3S=9SO_2(g)+6H_2O$$

as a summary:

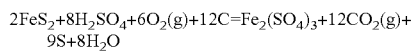
$$2FeS_2+8H_2SO_4+6O_2(g)+12C=Fe_2(SO_4)_3+12CO_2(g)+9S+8H_2O$$

FIG. 1 shows the process diagram starting with the preparation of the agglomerated particles mass to be leached, and ends with delivering an electrolyte containing the dissolved metals.

Comprehensive Description of the Blending Device for Solid Products

The function of the "Blending device" is to blend the pyrite ore concentrate mineral with fine activated carbon to be used as an additive in the chemical reaction of the process, and later it agglomerates the homogeneous blend by spraying sulphuric acid concentrate delivering this preparation to the next stage.

This device is made up of two receiving chutes (1 and 2) for each of the foregoing products. The lower part of each chute has a "worm gear" feeders (3) capable to control the discharge of the material coming from each storage reservoir.

This device has a continuous operation wherein the products at a first stage (4) are unloaded into the blender equipped with a mechanical agitation system made up of a horizontal axis and radially arranged metal rods, spinning and mixing the products till obtaining an homogeneous mass.

The homogeneous blend is transferred by overflow to a second stage (5) of the blending device, equipped with the same mechanical agitation system, wherein an injector (6) sprays sulphuric acid concentrate coming from its reservoir (7) in a controlled manner in order to produce a mass of agglomerated/irregular particles, whose size must be in a range between 5 to 8 mm. The weight percentage of sulphuric acid to be used in this operation should not be higher than 55% of the weight of the solid blend to be sent to process.

Comprehensive Description of the Reaction Device
a) The mass of agglomerated particles thus obtained is transferred to a first multi mode chamber (14) where it is subject to industrial microwaves energy with a frequency of 915 MHz continuously coming from a generator (8). This mass is transferred onto the surface of a horizontal segmented belt, manufactured with Teflon components (9). An option could be its manufacturing made with flexible Teflon tape, if the manufacturer can offer such supply. This mass spins inside the multi mode chamber. The microwaves power continuously applied allows to increase the incoming temperature of the agglomerated particles mass, until reaching the reaction temperature ranging between 180° C. to 200° C.
b) As it is necessary to continuously modify the position of the mass particles, in order to improve absorption of microwave energy, the segmented belt has a device (10) that allows to control such action. This device has been designed in such a way as to better adjust the path, position and rotation of the reactant mass of particles. It is installed on all segmented belts of the 2 multimodal chambers that make up the process.
c) Once the aforementioned thermal range has been reached, and the sulphuric acid used for the agglomeration has been exhausted (color changes and disaggregated status of the particulate matter), the material is removed from the multi mode chamber onto a "disaggregating-reagglomerating" device (11) and its granular component is subject to fine disaggregation passing through rollers and next spraying a second mix of sulphuric acid with a minimum purity of 96%, mixed with pressurized oxygen. This resulting product is obtained by using a suitable/safe blender, mixing both materials in a stoichiometric proportion, according to chemical reactions of the process.
d) The disaggregated/re-agglomerated product of the first chamber goes to a second multi mode chamber wherein microwaves power, supplied by a second generator (13) are applied. Such chamber has two segmented belts (9) similar to the one used in the first multi mode chamber, in a parallel arrangement, wherein the industrial microwaves energy are applied with a specific profile, in order to keep reaction temperature within a thermal range not higher than 200° C.
e) According to the foregoing for the first multi mode chamber, it is necessary to continuously change the path and position of the mass particles, in order to improve the absorption of microwaves energy. In order to do so, a second device aimed to modify the path of particles (10) is set onto the segmented belt, which has been designed, according to the aforementioned directions.

f) The particulate matter coming out from the first segmented belt of the second multi mode chamber is removed from such chamber to a "disaggregating-reagglomerating" device (11) in order to finely disaggregate its granular component by using rollers and next spraying a third blend of sulphuric acid concentrate, with 96% minimum purity, mixed with a fine spray of pressurized oxygen, just as explained in the previous paragraph.

g) The disaggregating-reagglomerating (11) device is made up of a chute for receiving the mass unloaded by the segmented belt, whose lower portion has a couple of identical/parallel horizontal Teflon rollers, separated not more than 2 mm between each other and rolling on a contrary flow. The mass of disaggregated particles feeds a mechanical agitator aimed to blend the disaggregated material with one additional proportion of sulphuric acid concentrate blend of 96% of minimum purity mixed with finely sprayed pressurized oxygen, similar to the description made in the previous paragraph.

h) Both multimodal chambers equipped with microwaves power have an inner design including an upper cover (16) aimed to exhaust sulphurous gases into an elemental sulphur (17) collecting system, i) Both multimodal chambers have accessories, such as thermal sensors, flow sensors for sulphuric acid and pressurized oxygen, whose signals go to a dashboard for controlling chemical reactions inside each of the chambers (26).

Comprehensive Description on how to Obtain the Aqueous Phase Carrying Dissolved Metals j) This process is designed with a mechanical agitation tank (22), an aqueous supply (21) and vertical plates installed inside and around in order to avoid rotation of the blend and thus to facilitate dissolution of metals of interests. It has a motor driven helicoidal agitator. The discharge chute is conical with controllable opening valve.

k) it has a clarifying tank (23), used to settle the solid inert material (25) and aimed to obtain clarified electrolyte containing dissolved metals (24).

Comprehensive Description of the Device Used for Extracting Elemental Sulphur Obtained from the Process l) it has been designed with a centrifugal extractor (18) aimed to vacuum sulphurous air coming from the process and makes it circulate inside the gases washing tower (17) equipped with water spraying systems (27) aimed to generate a fine spray inside it. This process allows particulate-matter-free air (28) gases to come out.

This invention, also describes a method using aqueous means for solubilizing metals contained in sulphur type ore concentrate, containing platinum group metals and other precious components by means of the previously described system, whose stages are as follows:

a) Introducing ore concentrate in the first chute (1); introducing vegetable charcoal, in the second chute (2);

b) Blend these components till getting a homogeneous mass;

c) spray an acid dose onto the resulting blend in order to obtain an irregular/agglomerated shaped mass of particles, with a size between 5 to 8 mm;

d) transfer the agglomerated particles mass onto the conveying device in order to feed the multimodal chambers with the product;

e) In the first multi mode chamber-generating group (14), apply continuous industrial micro waves power, at 915 MHz, in order to raise the temperature till reaching 180 to 200° C.;

f) in the second multi mode chamber generating group (15), apply discontinuous industrial microwaves energy, according to a thermal profile set for keeping reaction temperature ranging between 180 to 200° C.;

g) disaggregate the material coming out from the reactions of the previous steps for reducing the size of the grains;

h) once again agglomerate disaggregated product, by finely spraying sulphuric acid concentrate, at 96%, mixed with pressurized oxygen in a stoichiometric proportion, according to chemical reactions of this process (12);

i) modify the path and position of the grains of the reactant mass;

j) exhaust the sulphurous gases generated by the chemical reactions of the process;

k) carry sulphurous gases to a column wherein water is sprayed on the counterflow of the sulphurous gas;

l) blend the sulphated outcoming material with industrial water coming from the reaction stage in the agitation tank equipped with blades and vertical plates;

m) obtain an electrolyte with the dissolved metals of commercial interest (24); and n) to clarify the electrolyte containing dissolved metals (23) of commercial interest.

EXAMPLES

Although the method is applicable to all types of metal sulphide mineralogy, whether it is copper or iron, as a raw material it has used a highly pure concentrate, of about 96%, a vegetable charcoal carrier, a device aimed to blend sulphuric acid concentrate with pressurized oxygen, a blending/homogenizing device for solid components, a device that allows to turn products to be treated into a particulate matter mass and a 2,450 Megahertz microwaves oven with an inner power of 1.1 kW.

As the first part of the method, the operations start with a blending device producing a homogeneous mass from the solid components which shall be later sprayed with sulphuric acid, at a minimum concentration of 96%, in order to produce a particulate matter mass. In the various tests made, nearly 120 grams of ore concentrate were used to be blended and homogenized with one dose of fine solid carriers vegetable organic coal, whose amount was between 70 to 90 grams of fine coal content. Both materials had a humidity percentage lower than 0.5%. The homogeneous blend was sprayed with sulphuric acid, with a concentration higher than 96%, with a sufficient amount for producing a mass of fine agglomerated particles, with a size between 5 to 8 mm.

The amount of sulphuric acid concentrate for obtaining such agglomerated mass varied between 100 to 110 grams. When applying this amount, the original temperature of the blend raised from an original range of 18° C. to 23° C. to a slightly higher temperature, 80° C.

The resulting particulate matter mass, was fed into the second process of the method. At this stage continuous microwave energy is applied, with a power of 1.1 kW.

As a background to facilitate an explanation of the method, this type of energy is used, because two of its properties are applicable for these metallurgy processes. The first one is the dielectric property of the sulphides subject to microwaves. This indicates that, in general, sulphide type mineralogy has a very low electric conductivity, but at the same time, it is capable to form electric dipoles when exposed to microwaves fields. Such dipoles oscillate at the same frequency than the applied microwave; therefore the microwave energy is dissipated as heat. The second property is the microwaves interaction with liquid dipolar structures. Water molecule is dipolar, sulphuric acid is dipolar by including the water polarity in its formation. Therefore, application of microwaves power is a catalyzer of chemical reactions for the mineralogy hereby studied.

For each of the tests made, the previously described agglomerated mass was subject to microwaves. After 8 to 10 minutes, the process was ceased in order to watch the changes. The acid used in the agglomeration was proved to be exhausted; consequently the original particles were enlarged and hardened, so it was necessary to disaggregate them. The temperature reached at the end of such period varied from 165 to 203° C. A thermal device was used to measure the temperature of the material on the dish of the oven.

The disaggregated mass was once again finely sprayed with sulphuric acid, driven by pressurized oxygen (3 bar), using a spraying gun with a stainless steel nozzle. Every time the material was pun into the oven the temperature was checked 3 times, every 4 minutes. The temperature remained between 172 to 190° C. According to the method, what was made after the first 8 minutes was redone after 12 minutes. Sulphuric acid dosage was 100% met. This was calculated considering the chemical estechyometry of the main reaction, plus the additional consumption, given the interaction of the sulphuric acid with the elemental sulphur formed during the reaction.

For each test—once the aforementioned thermal range was reached—it was necessary to keep it by applying low microwave energy, using a manual infrared sensor displaying digital temperature of the process. Discrete application of this microwave energy meant to turn on the energy when the temperature went below 180° C. and to turn it off when exceeded 200° C.

Along with measuring process temperature, we had to watch the physical appearance of the mass of particles, checking if a new dosage of sulphuric acid had to be applied, this time as pressurized oxygen spray. At the same time, the average size of the mass particles was also physically assessed, checking if size was reduced and proceed.

During the reaction, particulate matter released elemental sulphur when the sulphurous anhydride reacted with the coal containing material. The catalyzer or technical accelerator of this reaction is applying microwaves power on the reactant mass, which as been empirically proved.

The sulphate crystals formed during the reaction, grow in size, dragging the non reacting material and must be reduced in size in order to keep a specific reaction surface (cm$^2$/grams of particulate matter under reaction) to contact the pressurized oxygen sprayed sulphuric acid.

The product from the reaction is a solid particulate matter mass. When mixed with water it allows to dissolve various sulfated metals which may be extracted with well known solvent extraction processes.

The chemical analysis made (Informe SERNAGEOMIN #2017-027) for calculating extraction of metal rhodium, was obtained from 4 tests made. In order to do so, a concentration of 10 parts per million of rhodium in the original sample used in the experiences was considered. The chemical analysis of the remaining solid samples, resulting from the process and their relevant mass balance are described in Table #1.

TABLE 1 chemical analysis of the remaining solid samples, resulting from the process:

| Sample | Extraction (%) |
|---|---|
| 1 | 99.90 |
| 2 | 99.97 |
| 3 | 99.94 |
| 4 | 99.95 |

In the sample the chemical analysis for metals, such as platinum, palladium, iridium and gold was made considering parts per trillion (ppb).

The invention claimed is:

1. A system to use an aqueous means to generate solubility on components contained in a sulphurous ore concentrate containing iron, cobalt, nickel, copper, and platinum group metals comprising:
   a) a blending device made up of:
      a first chute containing the ore concentrate (1),
      a second chute containing carbon containing material (2),
   wherein each one of the first chute and the second chute has a worm gear,
      a first deposit (4) for solid blends,
      a second deposit (5) for adding sulphuric acid, a reservoir for sulphuric acid concentrate (7), and
      an injector (6) for spraying sulphuric acid onto the solid blend;
   b) a device for chemical reactions made up of:
      a first microwaves power generator (8), equipped with flow, pressure & temperature sensors (26) a second microwaves power generator (13),
      a first multi mode chamber (14), and
      a second multi mode chamber (15),
   wherein each multi mode chamber has one or more conveyor belts (9),
      and also, each multi mode chamber has one or more modifying devices for positioning solid particles (10);
   c) external disaggregators (11);
   d) an additional blending device suitable to make a blend made up of sulphuric acid concentrate, with minimum purity of 96%, and gaseous oxygen applied at stoichiometric pressure, equipped with accessories to control its internal behavior, including pressure and temperature sensors, designed with opening devices for installing components aimed to facilitate contact between acid and oxygen, and other components facilitating input/output of materials associated to this blend preparation, to be sprayed onto the material unloaded by the external disaggregators (12); and) a sulphurous gases collecting device comprising:
      a hood for extracting sulphurous gases (16), and
      a water trap for sulphurous gases (17), containing industrial water (27);
   f) a device for extracting the elemental sulphur (18);
   g) an agitation tank (22); and
   h) a clarifying tank (23).

2. The system of claim 1, wherein the blending device a) comprises a first chute (1) for feeding ore concentrate and a second chute (2) for feeding a vegetable charcoal carrier, wherein each of the first and second chutes includes a cover to avoid contamination caused by airborne particulate matter and a lower portion of each chute has a worm gear suitable for unloading in a controlled manner, the material of each chute to a first deposit of the blender (4, 5) equipped with a mechanical agitation system made up of a horizontal axis and radially arranged metal rods, spinning the products in order to mix them and make them homogeneous.

3. The system of claim 1, wherein the chemical reactions device b) is made up of two 915 MHz-frequency microwaves energy industrial generators (8, 13) and two multimodal chambers (14, 15) aimed to receive microwaves power, named as "primary" (14) and "secondary" (15), chambers, equipped with devices enhancing the catalytic effect of the microwaves power applied onto chemical reactions of the process.

4. The system of claim 1, wherein the conveyor belts operate inside each multi mode chamber (14, 15), and it is made up of horizontal conveyance levels made of flexible Teflon (9), onto which the particulate matter mass to be subject to chemical reactions of the process is transferred, whose function is to blend such material inside it.

5. The system of claim 1, wherein the external c) disaggregators (11) are located at a product outlet of the multimodal chambers (14, 15), whose function is to disaggregate the material coming out from the reactions, to reduce the size of the grains and to make them pass through two Teflon rollers with counter flow spinning, and next to re-agglomerate the disaggregated product by finely spraying a mix of sulphuric acid concentrate, at 96% minimum purity and gaseous oxygen supplied by the reservoir (19), at a pressure calculated as per chemical stoichiometry.

6. The system of claim 1, further comprising a blending device with a suitable/safe metal structure to stand high safety pressure of around 35 bars, with a highly oxidant blend and pressurized gaseous oxygen, both stoichiometricly blended, where the pressurized oxygen varies between 9 to 15 bars.

7. The system of claim 1, wherein the accessories used to modify the position, path and rotation of the particles components of the mass to be subject to the process (10) have adjustable components for such purpose (9), that are applicable for each chamber (14, 15) thus allowing better global absorption of the microwaves power applied.

8. The system of claim 1, wherein the sulphurous gases collecting device is made up of one Teflon cover inside each chamber (14, 15), whose connection with an external air extractor (16), allows exhaustion of sulphurous gases formed during chemical reactions of the process.

9. The system of claim 1, wherein the device for extracting the elemental sulphur comprises a duct carrying sulphurous gases to a column wherein water is sprayed on the counterflow of the sulphurous gas, a gases washing tower (17) containing aqueous supply (27), which allows to collect the recovered sulphur, and a centrifugal extractor (18), vacuuming sulphurous gases from each of the multimodal chambers (14, 15), emitting particulate-matter-free air (28).

10. The system of claim 1, wherein a resulting sulfated product (20) is fed into the agitation tank (22) g), which is equipped with blades for controlling turbulence and industrial water supplied (21) according to the amount of incoming mass, in order to dissolve commercial interest metals.

11. The system of claim 1, wherein the clarifying tank (23) is equipped with an option to add flocculants, aimed to accelerate clarification and designed for settling insoluble/inert products or materials into the sulphation process.

12. A method using aqueous means for solubilizing metals contained in a sulphurous ore concentrate containing iron, cobalt, niquel, copper, and a platinum group metal by using the system of claim 1, the method comprising:
   a) introducing dry ore concentrate in the first chute (1) and introducing vegetable charcoal in the second chute (2);
   b) blend the products till obtaining an homogeneous mass;
   c) the resulting blend is sprayed with a dose of sulphuric acid for producing an irregular shaped mass of agglomerated particles, whose size ranges between 5 to 8 mm;
   d) deposit the agglomerated particles mass on the conveying device and spin the product inside the multimodal chambers;
   e) in the first multi mode chamber-generating group (14), apply continuous industrial micro waves power, at 915 MHz for raising the temperature up to a range between 180 to 200° C.;
   f) by using the second group generator-multi mode chamber (15), apply discontinuous industrial microwaves energy and, according to a thermal profile set for keeping reaction temperatures within the expected range between 180 to 200° C.;
   g) disaggregate the material coming out from the reactions of the previous steps, for reducing the size of the grains;
   h) agglomerate once again the disaggregated product, by finely spraying sulphuric acid concentrate at 96%, mixed with pressurized oxygen in a stoichiometric proportion;
   i) modify the path and position of the grains of the reactant mass;
   j) exhaust sulphurous gases resulting from chemical reactions of the process;
   k) carry sulphurous gases to a column wherein water is sprayed on the counterflow of the sulphurous gas;
   l) blend the sulphated material-coming out from the reaction stage—with industrial water, in the agitation tank equipped with blades and vertical plates;
   m) obtain an electrolyte with the dissolved metals; and
   n) to clarify the electrolyte carrying dissolved metals (23).

\* \* \* \* \*

UNITED STATES PATENT AND TRADEMARK OFFICE
CERTIFICATE OF CORRECTION

PATENT NO. : 12,098,443 B2  
APPLICATION NO. : 17/271730  
DATED : September 24, 2024  
INVENTOR(S) : Antonucci Salazar Page 1 of 1

It is certified that error appears in the above-identified patent and that said Letters Patent is hereby corrected as shown below:

On the Title Page

In Column 1, item (73), in Assignee, Line 2, delete "Vina" and insert -- Viña --, therefor.

In the Claims

In Column 10, Claim 1, Line 53, delete "and)" and insert -- e) -- at Line 54, as a new sub-point.

In Column 11, Claim 6, Lines 33-34, delete "stoichiometricly" and insert -- stoichiometrically --, therefor.

In Column 12, Claim 12, Line 13, delete "niquel," and insert -- nickel, --, therefor.

In Column 12, Claim 12, Line 25, delete "micro waves" and insert -- microwaves --, therefor.

Signed and Sealed this  
Seventeenth Day of December, 2024

Derrick Brent  
*Acting Director of the United States Patent and Trademark Office*